UNITED STATES PATENT OFFICE.

JOHN DAIN, OF UTICA, OHIO.

IMPROVEMENT IN COMPOSITIONS FOR PRESERVATION OF TIMBER.

Specification forming part of Letters Patent No. 29,363, dated July 31, 1860.

*To all whom it may concern:*

Be it known that I, JOHN DAIN, of Utica, county of Licking, and State of Ohio, have invented a new mode of preventing the rotting of timber by means of a liquid composition; and I do hereby declare that the following is a full and exact description thereof, viz:

I employ a liquid composed of common salt, lye, and spirit of turpentine, prepared as follows, viz: Run off the lye from a common leach; then evaporate it till strong enough to destroy a feather. Of this concentrated lye take one part; add thereto one part of spirit of turpentine and five parts of a saturated solution of common salt in water. For timber of very close grain I add an additional one-fourth ($\frac{1}{4}$) part of spirit of turpentine. The object of my mode of preparing the timber is to fill the cells thereof with the above-described liquid, and thereby secure it against rot. This I effect by boring auger-holes, in number and size proportioned to the size of the timber, and therein inserting the above composition. The size and position of the auger-holes must be regulated by the size and position of the piece of timber to be preserved—for example, a fence-post, already placed in the ground four inches by seven inches thick, length seven feet, commence the hole six to ten inches above the ground, as nearly in a vertical direction as possible, so as to be eight to ten inches deep; keep this hole filled with the above composition till the post is sufficiently saturated. In a building, either before or after raising, in the sills, bore the holes from six to eight feet apart and in a direction diagonally across the stick, but not quite to perforate the same. In the post commence three to five feet above the bottom shoulder, in the same direction and manner as for the fence-post; all the mud-sills for trestle-work and heavy caps for the same, and all such description of work in the same manner as sills, and the posts as in the posts of buildings. All close mortises should also be filled with the same. In heavy gate-posts and other heavy posts more holes than one will be required. The progress in and through the timber of the said liquid is easily observed, and the number of auger-holes may be regulated accordingly. Planks and boards can be sufficiently saturated by immersion in the composition contained in vats.

I do not claim broadly the use of either of the three ingredients in my composition in the preservation of timber; but

What I claim as my invention is—

The mode of preserving wood from rotting by means of the above-described composition being inserted therein, as described, or in any other way.

JOHN DAIN.

Witnesses:
JAS. BUR THOMAS,
JOHN GARRETT.